March 25, 1958  L. BERI  2,828,096
FISHING ROD HOLDER
Filed March 7, 1955  2 Sheets-Sheet 1
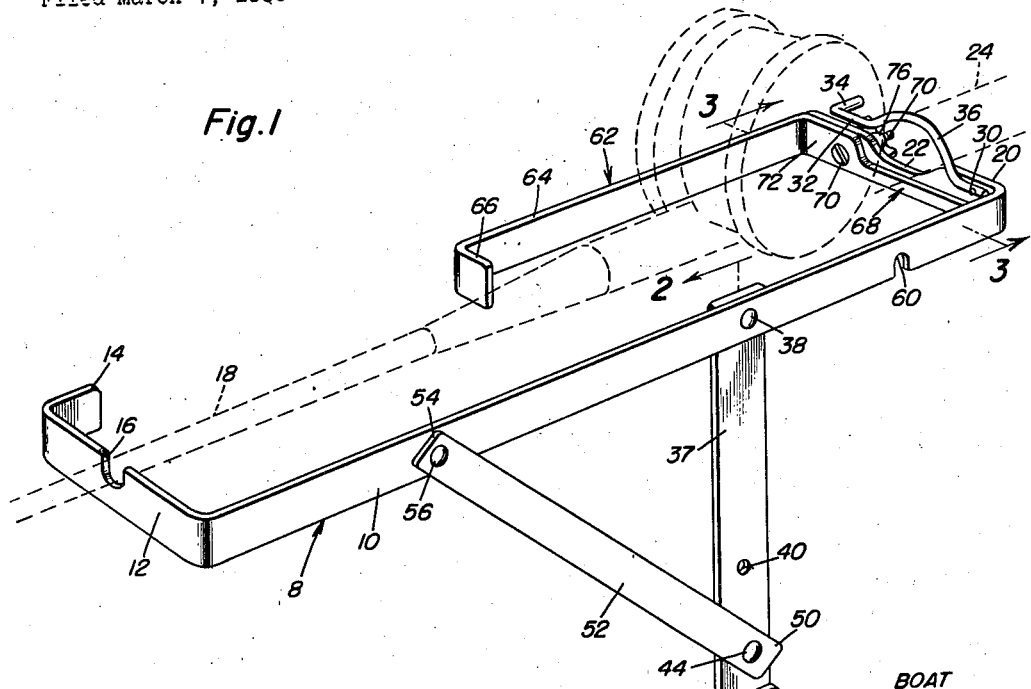
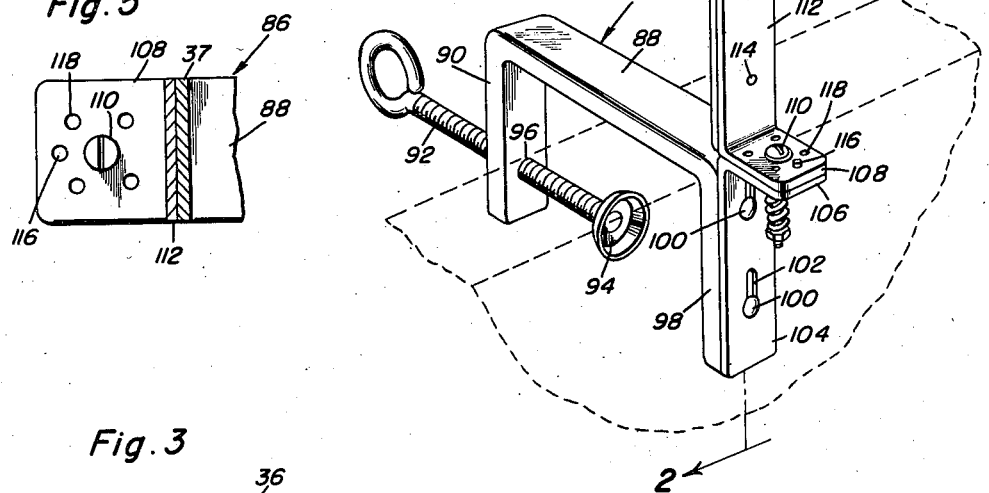
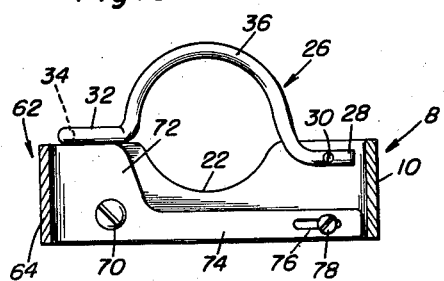
Laslo Beri
INVENTOR.

March 25, 1958  L. BERI  2,828,096
FISHING ROD HOLDER
Filed March 7, 1955 2 Sheets-Sheet 2
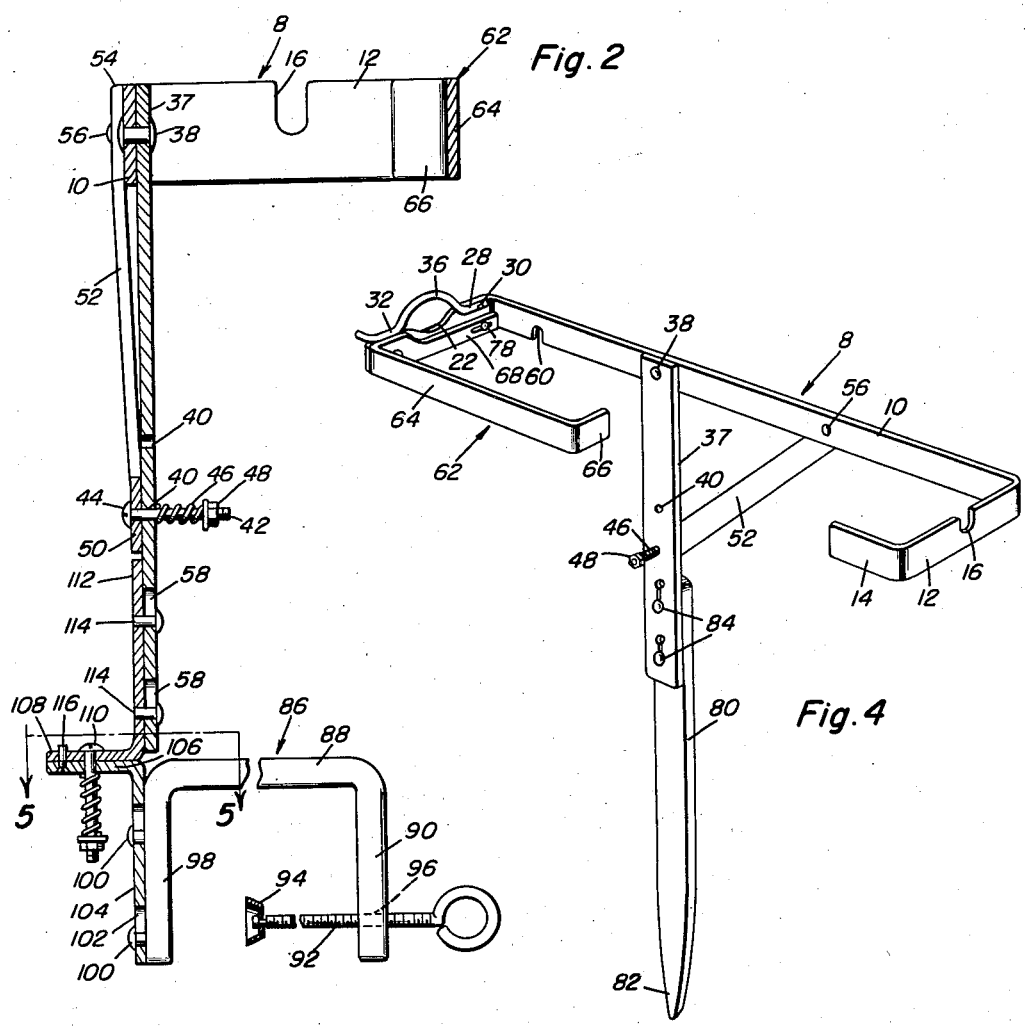
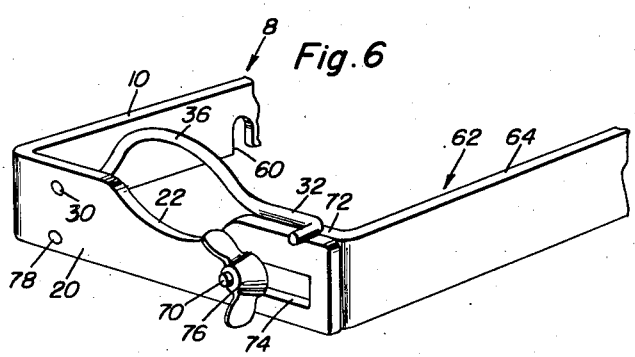
Laslo Beri
INVENTOR.

United States Patent Office 2,828,096
Patented Mar. 25, 1958

2,828,096

FISHING ROD HOLDER

Laslo Beri, Sharon, Pa.

Application March 7, 1955, Serial No. 492,621

2 Claims. (Cl. 248—40)

The present invention relates to an improved holder for a fishing pole or, alternatively, a fishing rod having a reel attached thereto and appertains, more specifically, to a holder which may be conveniently staked down and used on the shore, or attached to and used in conjunction with a simple U-shaped or equivalent boat clamp.

An object of the invention is to provide a fishing rod holder which functions to support said rod in an out-of-the-way but ready-to-use position, whether attached to a ground stake or part of a boat, and which allows the fisherman to have both hands free to take care of boat chores, to mend tackle, or to bait hooks, all within reach of the stated holder so that as soon as a strike is noticed, the rod may be lifted from the holder and maneuvered according to the particular requirements at hand.

Another object of the invention is to provide a simple, U-shaped boat clamp, a pair of upper and lower L-shaped brackets, the lower bracket being detachably mounted on the clamp, the upper bracket being swivelly and detachably connected with the lower bracket and constructed to accommodate a readily attachable and detachable leg, said leg serving as a support for a yoke, and the yoke serving as the holder on which the stated rod is laid or positioned for ready use.

Another object of the invention is to provide a yoke, as stated, with a depending leg, the leg being hinged on the yoke for folding, and there being a hinge or folding stay, the lower end of which is adjustably connected with the leg and both stay and leg being foldable into compact relationship with the yoke for storage and transportation.

A further object of the invention is to provide a yoke which is provided with a handy retaining latch, said latch serving to cooperate with a handle seating notch and the latch being of springy construction and serving to embrace and clamp the handle in the notch.

Then, too, it is a further object of the invention to provide the yoke with an adjustable as well as detachable L-shaped arm which functions as a rest and stabilizer for the customarily used reel so that when the rod and reel are picked up for handling, the reel will be in an advantageous position for expeditious use.

Other objects, features and advantages will become more readily apparent from the following description and the accompanying sheet of drawings.

In the accompanying drawings, wherein like numerals are employed to designate like parts throughout the views:

Figure 1 is a perspective view of a fishing rod and reel holder showing the same set up for use and attached to means whereby it may be supported from a boat or the like;

Figure 2 is a view with parts in elevation and section taken on the vertical line 2—2 of Figure 1;

Figure 3 is an enlarged cross-section on the line 3—3 of Figure 1;

Figure 4 is a perspective view similar to Figure 1 and wherein the rod holder is shown attached to a ground anchoring stake;

Figure 5 is a fragmentary section on the line 5—5 of Figure 2, the scale of the view being slightly enlarged; and Figure 6 is a fragmentary perspective view of one end portion of the yoke, and an adjacent end portion of the reel stabilizing rest.

Since the invention is of a knockdown or folding construction and also convertible, the main assembly or structural parts thereof will be touched upon first. To this end, the holder proper comprises a metal or equivalent so-called yoke 8. This embodies a linearly straight bight portion 10, a forward lateral end member 12 having a return bend 14 at its free end portion. In the central upper edge, there is a seating notch 16 for the median portion of the rod, that is, the portion 18 as shown in Figure 1. The rearward lateral end member is denoted at 20 and it, too, has a seating notch 22 which is centrally arranged and fashioned to accommodate the handle 24. As perhaps best shown in Figure 3, the safety retaining latch 26 is provided at this end, and this is a stout rod member having one end portion 28 superimposed against the end member and fastened or secured thereto, as at 30. The opposite end portion 32 has a lateral terminal 34 which forms a finger piece. The intermediate arcuate bend 36 is above and registers with the seating notch 22 and forms a clamp. It embraces a handle. This latch is sufficiently resilient that the free end portions 32 and 34 may be lifted up to allow the handle to be inserted and seated, and thereafter, removably clamped in place.

The aforementioned leg is denoted by the numeral 37 and has its upper end superimposed upon the interior surface of the intermediate portion of the bight portion, and hingedly or pivotally connected thereto, as at 38. The intermediate portion of this leg has bolt holes 40 to accommodate the shank 42 of the bolt 44 (Figure 2) and this bolt is provided with a coil spring 46 and nut 48 and is carried by the lower end 50 of a diagonal brace or stay 52. The upper end 54 of this is hingedly connected at 56 to the intermediate portion of the bight portion 10. Also, as shown in Figure 2, the lower end portion of this leg is provided with slots 58 which function in a manner to be later described. It is to be pointed out that the bolt 44 may be removed from either of the bolt holes, whereupon the then released leg 37 may be folded from right to left inside the bight portion for compactness and convenience. The stay 52 may be folded against the exterior side of the bight portion, and the bolts 44 reinserted and accommodated in the accommodation notch 60 (Figure 1).

It follows that we have here a yoke for supporting and latching the fishing rod in the manner shown, and a folding leg and stay which may be set up in the manner shown in Figure 1 to permit the holder to be employed in a somewhat obvious manner.

In some instances, heavy reels are provided on a fishing rod and it may be, and often is, desirable to also provide an extra rest or stabilizer for the reel. In other words, the end members 12 and 20 provide the rests for the fishing rod, and the latter is latched in place. However, a heavy reel may tend to turn or twist the rod, and therefore, the stated stabilizer is desired, and this is denoted in Figure 1 by the numeral 62. It is a simple substantially L-shaped arm 64 having an inturned lateral terminal portion 66. As a matter of fact, this part 62 may be thought of as comprising a long arm 64 and a short arm 68. The latter arm is superimposed against the interior surface of the aforementioned end member 20, as perhaps best shown in Figure 3. It will be noticed that a bolt 70 is provided, and this passes through the broad end portion 72 and then through a slot 74 where it serves to accommodate a wing nut 76, as brought out in Figure 6. This provides a detachable and adjustable connection between the parts, as is obvious. Also as seen in Figure 3, the narrow end portion 74 has an elongated slot 76 to accommodate a fastening screw 78. It follows that this stabilizing unit of arm 62 may be adjusted towards and from the bight portion, or it may be completely detached whenever it is not necessary to use it. Therefore, it is an optional but handy part.

The description so far covers the leg equipped brace holder plus the optional reel rest and stabilizer 62. This entire device may be supported on a boat or attached to a ground stake, as is evident from the drawing. In the simpler arrangement seen in Figure 4, the numeral 80 designates a ground stake which is pointed at its lower end, as at 82. The upper end is provided with fasteners 84 which provide the desired separable connection between the slotted end portions of the leg and the stake, in an obvious manner.

When using the device on a wharf or boat, a common U-shaped boat clamp is provided, as at 86 in Figure 1, having a bight portion 88, a depending limb 90 carrying a setscrew 92 with a swivel head 94 with a screw passing through a screw threaded hole 96. The opposite depending limb 98 is provided with headed studs 100 fitting into keyhole slots 102 in the vertical limb 104 of a so-called lower L-shaped bracket. The horizontal limb 106 is provided with a central hole registering with a similar hole in the short limb 108 of the upper L-shaped bracket. These two short limbs are bolted together as at 110 to provide a swivel connection. The long limb 112 has fasteners 114 with which the slots in the legs 36 are separably connected, in an obvious manner. There is a keeper pin 116 carried by the limb 106 and this is selectively fitted into keeper seat 118, thus providing not only a swivel connection between the brackets, but a regulable connection. This makes it possible to adjust the yoke 8 in a horizontal plane about this vertical axis while supporting the device on a boat. Not only this, the frame-like yoke 8 is capable of being tilted relative to the legs by adjusting the bolt 44 and moving it up in the bolt hole 40 above it, as shown in Figure 1. Therefore, the leg is not only foldable, it is tiltable, or the yoke is tiltable in relation thereto in order to bring about the desired adjusting results. It follows that the rod may be handily placed on the yoke, swung about in a horizontal plane on the vertical axis stated and may be tilted up or down relatively to the horizontal plane.

It is understood that minor changes in shape, size and rearrangement of details may be resorted to without departing from the spirit and scope of the invention as claimed.

What is claimed as new is as follows:

1. For use by an angler, means for conveniently supporting a fishing rod in an out-of-the-way but ready-to-use position comprising, in combination, an elongated one-piece yoke having a lengthwise bight portion and lateral end portions having upper edges which are coplanar and in a plane which is also coplanar with the upper edge of said bight portion and providing longitudinally spaced rod rests, one end portion having an upwardly opening seating notch for an intermediate portion of said fishing rod, the other end portion likewise having an upwardly opening notch for the usual handle of the rod, a latch having one end fixed to said other end portion, the other end of said latch being free and springable toward and from the upper edge of said other end portion in a manner to allow said handle to be forcibly passed between the latch and said other end portion, the intermediate portion of said latch having a curvate bend rising above and bridging said handle seating notch in a manner to partially embrace said handle when the handle is removably latched and clamped in said seating notch, a leg fastened to said bight portion and depending therefrom and adapted to be secured to a relatively stationary foundation, a reel supporting and rod stabilizing arm coplanar with and spaced in parallelism from said bight portion and detachably and adjustably mounted on the last-named end portion, said arm being L-shaped in plan and embodying long and short portions, said long portion paralleling said bight portion and the short portion being superimposed upon and slidably and detachably bolted on said last-named end portion, said long arm portion being much shorter in length than said bight portion and having a free end terminating in spaced relation relative to the first-named end portion.

2. For use by an angler, means for conveniently supporting a fishing rod in an out-of-the-way but ready-to-use position comprising, in combination, an elongated one-piece yoke having a lengthwise bight portion and lateral end portions having upper edges which are coplanar and in a plane which is also coplanar with the upper edge of said bight portion and providing longitudinally spaced rod rests, one end portion having an upwardly opening seating notch for an intermediate portion of said fishing rod, the other end portion likewise having an upwardly opening notch for the usual handle of the rod, a latch having one end fixed to said other end portion, the other end of said latch being free and springable toward and from the upper edge of said other end portion in a manner to allow said handle to be forcibly passed between the latch and said other end member, the intermediate portion of said latch having a curvate bend rising above and bridging said handle seating notch in a manner to partially embrace said handle when the handle is removably latched and clamped in said seating notch, a folding leg having its normal upper end hinged to an intermediate portion of said bight portion, a folding stay having its upper end also hinged to said intermediate portion at a place spaced away from the hinged upper end of said leg, said leg having selectively usable bolt holes, and a nut and spring equipped bolt carried by the lower end of said stay and separably joined to said leg by way of a selected one of said bolt holes, said leg also having a plurality of slots at its normal lower end portion to facilitate detachable connection of the leg to a support part, a reel supporting and rod stabilizing arm coplanar with and spaced in parallelism from said bight portion and detachably and adjustably mounted on the last-named end portion, said arm being L-shaped in plan and embodying long and short portions, said long portion paralleling said bight portion and the short portion being superimposed upon and slidably and detachably bolted on said last-named end portion, said long arm being much shorter in length than said bight portion and having a free end terminating in spaced relation relative to the first-named end portion.

References Cited in the file of this patent

UNITED STATES PATENTS

| | | |
|---|---|---|
| 1,275,928 | Huppertz | Aug. 13, 1918 |
| 1,523,223 | Leonoardos | Jan. 13, 1925 |
| 1,963,463 | Hammer | June 19, 1934 |
| 2,416,828 | Hamre | Mar. 4, 1947 |
| 2,502,272 | Patton | Mar. 28, 1950 |
| 2,530,265 | Phalen | Nov. 14, 1950 |
| 2,530,873 | Grotz | Nov. 21, 1950 |
| 2,642,690 | Soenksen | June 23, 1953 |